(12) United States Patent
Lee

(10) Patent No.: US 12,271,552 B2
(45) Date of Patent: Apr. 8, 2025

(54) TOUCH SENSOR AND METHOD TO SENSE TOUCH OF USER HAVING TOUCH ELECTRODES

(71) Applicant: SAMSUNG DISPLAY CO., LTD., Yongin-si (KR)

(72) Inventor: Dong Chun Lee, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 20 days.

(21) Appl. No.: 18/331,639

(22) Filed: Jun. 8, 2023

(65) Prior Publication Data

US 2024/0134477 A1 Apr. 25, 2024
US 2024/0231533 A9 Jul. 11, 2024

(30) Foreign Application Priority Data

Oct. 20, 2022 (KR) .................. 10-2022-0136003

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0466; G06F 3/0418
USPC ........................................ 345/174
See application file for complete search history.

(56) References Cited

U.S. PATENT DOCUMENTS

| | | | |
|---|---|---|---|
| 11,360,613 B2 | 6/2022 | Ding et al. | |
| 2014/0292709 A1* | 10/2014 | Mizuhashi | G06F 3/0446 345/174 |
| 2014/0375591 A1* | 12/2014 | Chang | G06F 3/0446 345/174 |
| 2015/0062466 A1 | 3/2015 | Yun | |
| 2015/0261353 A1* | 9/2015 | Lu | G06F 3/04166 345/174 |
| 2015/0268758 A1* | 9/2015 | Lo | G06F 3/0446 345/174 |
| 2018/0329540 A1 | 11/2018 | Tan | |
| 2022/0100311 A1 | 3/2022 | Choi et al. | |

FOREIGN PATENT DOCUMENTS

| | | |
|---|---|---|
| KR | 10-2117102 | 6/2020 |
| KR | 10-2021-0157886 | 12/2021 |
| KR | 10-2022-0043999 | 4/2022 |

* cited by examiner

*Primary Examiner* — Mark Edwards
(74) *Attorney, Agent, or Firm* — F. Chau & Associates, LLC

(57) ABSTRACT

A touch sensor includes first touch electrodes, second touch electrodes that form mutual capacitances with the first touch electrodes, and a controller that generates touch data by applying a scan signal to each of scan lines connected to the first touch electrodes during substantially a same time and that receives sensing signals from the second touch electrodes through sensing lines. The controller applies a plurality of multiple pulses and a target pulse as the scan signal to each of the scan lines in a plurality of time periods. Each of the plurality of multiple pulses includes a first pulse and a second pulse of phases opposite to each other. Multiple pulses applied to scan lines adjacent to each other among the scan lines have phases opposite to each other.

17 Claims, 13 Drawing Sheets

TOUCH SENSOR AND METHOD TO SENSE TOUCH OF USER HAVING TOUCH ELECTRODES

CROSS-REFERENCE TO RELATED APPLICATIONS

This application claims priority under 35 U.S.C. § 119 to Korean Patent Application No. 10-2022-0136003, filed on Oct. 20, 2022, the disclosure of which is incorporated by reference herein in its entirety.

TECHNICAL FIELD

Embodiments of the disclosure relate to an electronic device, and more particularly, to a touch sensor and method to sense a touch of a user using touch electrodes.

DISCUSSION OF RELATED ART

Multimedia electronic devices such as, for example, a television, a mobile phone, a tablet computer, a navigation device, a game console, etc., typically include a display device that displays an image. The electronic device may include a touch sensor that allows a user to intuitively and easily input information and a command via a touch input in addition to a typical input interface such as a button, a keyboard, and a mouse.

SUMMARY

Embodiments of the disclosure provide a touch sensor and a touch sensing method in which generation of electromagnetic interference (EMI) may be minimized or reduced.

According to an embodiment of the disclosure, a touch sensor includes a plurality of first touch electrodes, a plurality of second touch electrodes that form mutual capacitances with the first touch electrodes, and a controller that generates touch data by applying a scan signal to each of scan lines connected to the first touch electrodes during substantially the same time and that receives sensing signals from the second touch electrodes through sensing lines. The controller applies a plurality of multiple pulses and a target pulse as the scan signal to each of the scan lines in a plurality of time periods, each of the plurality of multiple pulses includes a first pulse and a second pulse of phases opposite to each other, and multiple pulses applied to scan lines adjacent to each other among the scan lines have phases opposite to each other.

The plurality of multiple pulses may include first multiple pulses sequentially including the first pulse and the second pulse, and second multiple pulses sequentially including the second pulse and the first pulse.

The controller may be configured to apply the first multiple pulses and the second multiple pulses to the scan lines adjacent to each other among the scan lines, respectively.

The target pulse may include a regular pulse having a constant phase.

The target pulse may include the first pulse or the second pulse.

Each of the scan lines may receive the target pulse in different time periods among the plurality of time periods.

Target pulses respectively applied to the scan lines adjacent to each other among the scan lines may have phases opposite to each other.

The target pulses may include a first target pulse including the first pulse and a second target pulse including the second pulse. The controller may be configured to apply the first target pulse and the second target pulse to the scan lines adjacent to each other among the scan lines, respectively.

The controller may include a touch detector that generates the touch data by sensing the sensing signals through the sensing lines and decoding the sensing signals based on a matrix.

The controller may include a matrix generator that generates the matrix according to a scan signal applied to each of the scan lines. The matrix generator may output first signals corresponding to a logic level high in response to the plurality of multiple pulses of the scan signal, and output a second signal corresponding to a logic level low in response to the target pulse of the scan signal. The matrix may include matrix values corresponding to the first signals and the second signal.

The controller may include a matrix generator that generates the matrix according to a scan signal applied to each of the scan lines. The matrix generator may generate the matrix by performing an exclusive OR operation between pulses included in the scan signal in each of the plurality of time periods.

According to an embodiment of the disclosure, a touch sensor includes a plurality of first touch electrodes extending in a first direction and connected to scan line groups, a plurality of second touch electrodes extending in a second direction crossing the first direction and forming mutual capacitances with the first touch electrodes, and a controller that drives each of the scan line groups and generates touch data by receiving sensing signals from the second touch electrodes. The controller applies a plurality of multiple pulses and a target pulse to each of scan lines of a first scan line group among the scan line groups over first time periods. Each of the plurality of multiple pulses includes a first pulse and a second pulse of phases opposite to each other. In at least one of the first time periods, multiple pulses applied to scan lines adjacent to each other among the scan lines have phases opposite to each other.

The controller may be configured to apply the plurality of multiple pulses and the target pulse to each of scan lines of a second scan line group among the scan line groups over second time periods. In at least one of the second time periods, multiple pulses respectively applied to scan lines adjacent to each other among the scan lines of the second scan line group may have phases opposite to each other.

The target pulse may include a regular pulse having a constant phase.

Each of the scan lines may receive the target pulse in different time periods among the first time periods.

Target pulses respectively applied to the scan lines adjacent to each other among the scan lines may have phases opposite to each other.

According to an embodiment of the disclosure, a method of sensing a touch using first touch electrodes and second touch electrodes that form mutual capacitances with the first touch electrodes includes applying a scan signal to each of scan lines connected to the first touch electrodes during substantially the same time period, the scan signal including a plurality of multiple pulses and a target pulse in a plurality of time periods, and sensing the touch by receiving sensing signals from the second touch electrodes through sensing lines. Each of the plurality of multiple pulses includes a first pulse and a second pulse of phases opposite to each other, and the multiple pulses respectively applied to scan lines adjacent to each other among the scan lines have phases opposite to each other.

The method may further include outputting first signals corresponding to a logic level high in response to the plurality of multiple pulses of the scan signal, and outputting a second signal corresponding to a logic level low in response to the target pulse of the scan signal.

Sensing the touch may include sensing the touch by decoding the sensing signals based on a matrix including matrix values corresponding to the first signals and the second signal.

Applying the scan signal may include applying the target pulse to each of the scan lines in different time periods among the plurality of time periods.

According to embodiments of the disclosure, a touch sensor and a touch sensing method in which generation of EMI is minimized or reduced may be provided. For example, pulses respectively applied to scan lines adjacent to each other may have phases opposite to each other, and thus, EMI caused by the pulses applied to the scan lines may offset each other.

BRIEF DESCRIPTION OF THE DRAWINGS

The above and other features of the disclosure will become more apparent by describing in detail embodiments thereof with reference to the accompanying drawings, in which.

DETAILED DESCRIPTION OF THE EMBODIMENTS

Figure 1:
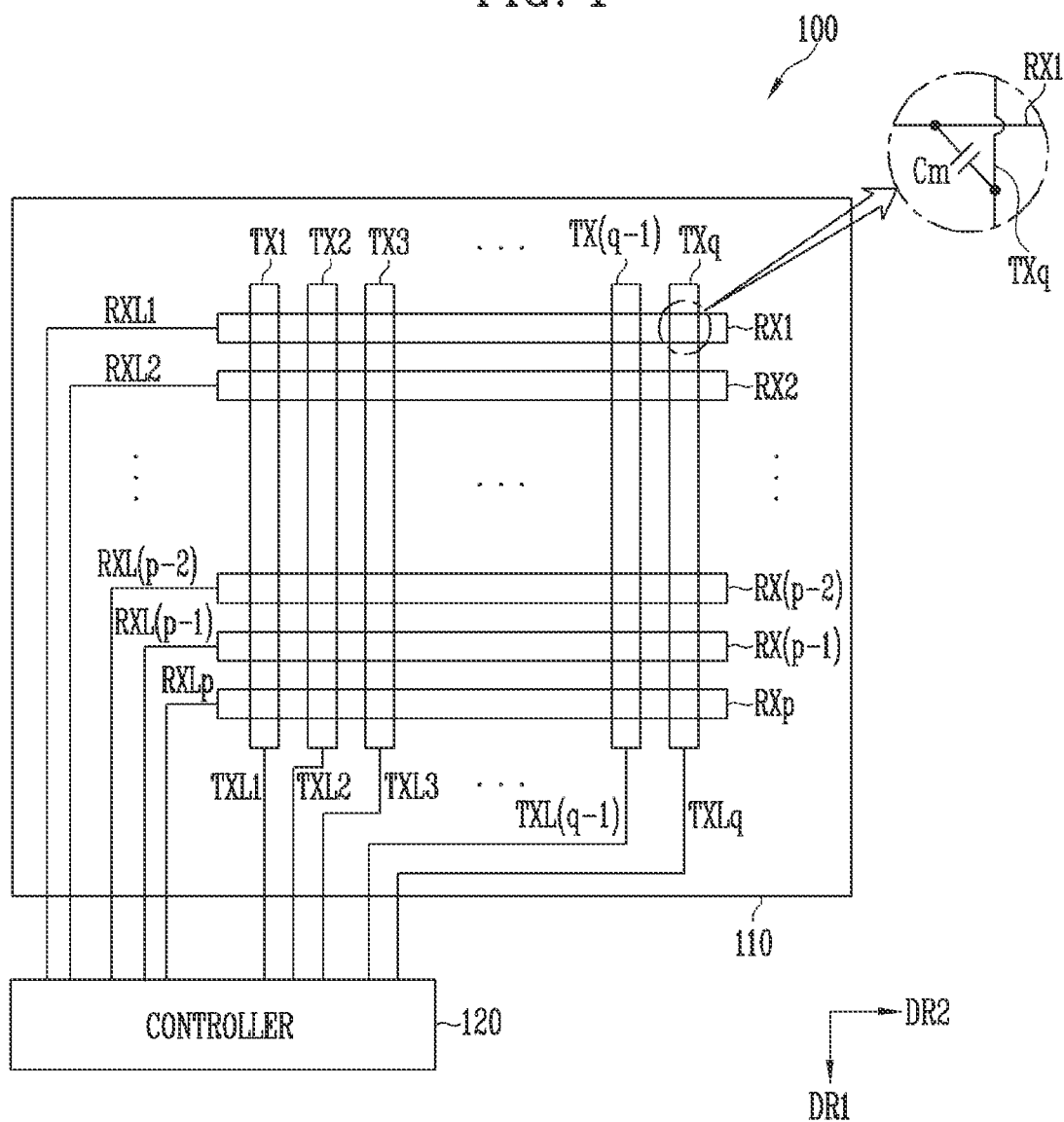
FIG. 1 is a block diagram illustrating a touch sensor according to an embodiment of the disclosure.

Embodiments of the disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

The terms of a singular form may include plural forms unless the context clearly indicates otherwise.

Herein, when two or more processes or events are described as being performed at or occurring at substantially the same time, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof.

In the following description, a case where a portion is connected to another portion includes a case where they are electrically connected to each other with another element interposed therebetween as well as a case in which they are directly connected to each other. In an embodiment of the disclosure, a term "connection" between two configurations may mean that both of an electrical connection and a physical connection are inclusively used.

FIG. 1 is a block diagram illustrating a touch sensor according to an embodiment of the disclosure.

Referring to FIG. 1, the touch sensor 100 may include a touch panel 110 and a controller 120.

The touch panel 110 may include first touch electrodes and second touch electrodes forming mutual capacitances with the first touch electrodes. The first touch electrodes may be provided as first to q-th scan electrodes TX1, TX2, TX3, . . . , TX(q−1), and TXq (where q is a positive integer). The second touch electrodes may be provided as first to p-th sensing electrodes RX1, RX2, . . . , RX(p−2), RX(p−1), and RXp (where p is a positive integer). The first to q-th scan electrodes TX1 to TXq may extend in a first direction DR1 and may be spaced apart from each other in a second direction DR2. The first to p-th sensing electrodes RX1 to RXp may extend in the second direction DR2 and may be spaced apart from each other in the first direction DR1. The first to p-th sensing electrodes RX1 to RXp may cross the first to q-th scan electrodes TX1 to TXq and may be electrically separated from the first to q-th scan electrodes TX1 to TXq to form the mutual capacitance with the first to q-th scan electrodes TX1 to TXq.

In FIG. 1, an equivalent circuit corresponding to a portion where the first sensing electrode RX1, which is any one of the first to p-th sensing electrodes RX1 to RXp, and the q-th scan electrode TXq, which is any one of the first to q-th scan electrodes TX1 to TXq, cross is shown. The first sensing electrode RX1 and the q-th scan electrode TXq may be electrically separated from each other, and thus, a mutual capacitance Cm may be formed between the first sensing electrode RX1 and the q-th scan electrode TXq. As such, mutual capacitances may be formed at portions where the first to p-th sensing electrodes RX1 to RXp and the first to q-th scan electrodes TX1 to TXq cross.

When a touch of a user is provided to the touch panel 110, one or more of the mutual capacitances may change. For example, the touch may include at least one of various types of inputs that cause a change of the mutual capacitance, such as a physical contact, hovering, or the like of the user. The controller 120 may recognize the touch by sensing such a change of the mutual capacitance.

The controller 120 is connected to the first to q-th scan electrodes TX1 to TXq through first to q-th scan lines TXL1, TXL2, TXL3, . . . , TXL(q−1), and TXLq. The controller 120 is connected to the first to p-th sensing electrodes RX1 to Rxp through first to p-th sensing lines RXL1, RXL2, . . . , RXL(p−2), RXL(p−1), and RXLp.

The controller 120 may sense sensing signals from the first to p-th sensing electrodes RX1 through RXp through the first to p-th sensing lines RXL1 to RXLp while applying scan signals to the first to q-th scan electrodes TX1 to TXq through the first to q-th scan lines TXL1 to TXLq. The controller 120 may sense the change of the mutual capacitance based on the sensing signals.

In embodiments, the first to q-th scan lines TXL1 to TXLq may be divided into a plurality of scan line groups, and the controller 120 may simultaneously apply scan signals to scan lines included in one scan line group. For example, the controller 120 may employ a multi-channel driving method. The multi-channel driving method may reduce one sensing frame period, but may cause relatively large EMI due to the simultaneously applied scan signals.

The simultaneously applied scan signals may be associated with an arbitrary encoding matrix. The controller 120 may detect a position of the touch by sensing the sensing signals through the first to p-th sensing lines RXL1 to RXLp and decoding the sensing signals based on a modulation matrix associated with the simultaneously applied scan signals. The modulation matrix may be obtained by encoding the above-described simultaneously applied scan signals.

Figure 2:
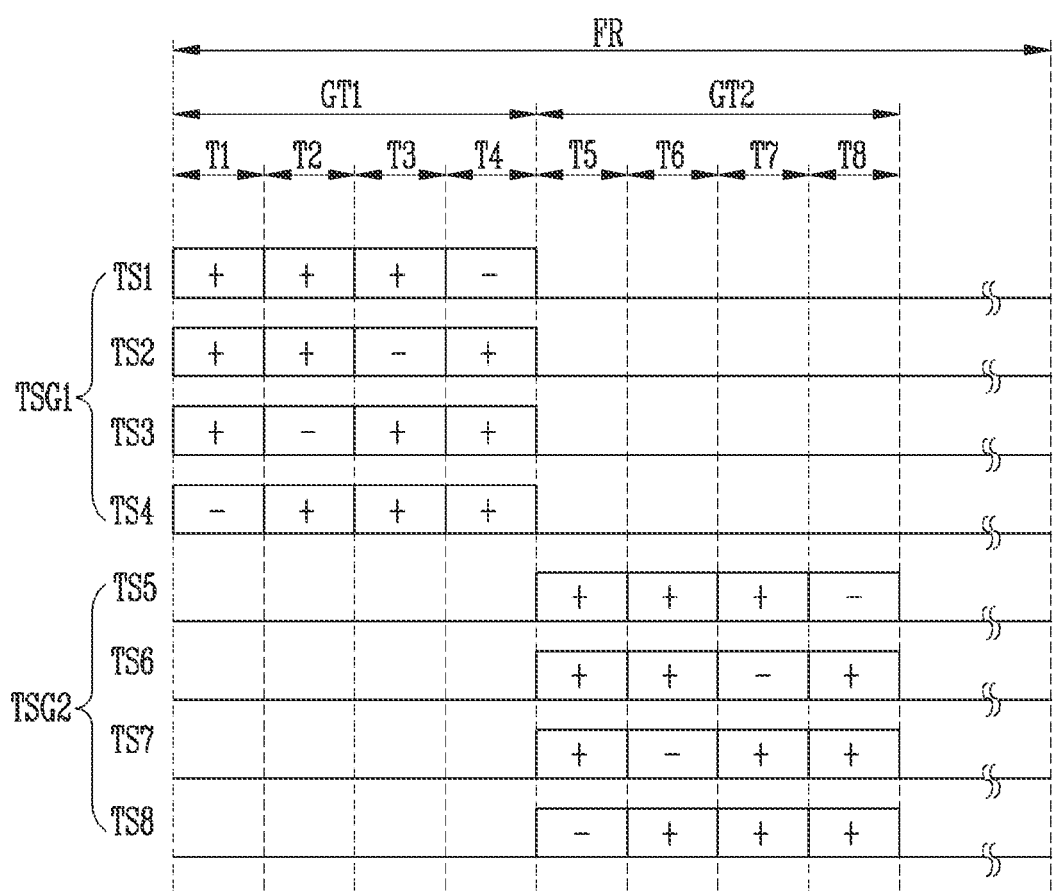
FIG. 2 is a timing diagram illustrating an example of scan signals that may be applied to scan lines of FIG. 1 in one frame.

FIG. 2 is a timing diagram illustrating an example of the scan signals that may be applied to the scan lines of FIG. 1 in one frame. In FIG. 2, first to eighth scan signals TS1 to TS8 respectively applied to the first to eighth scan lines TXL1 to TXL8 among the first to q-th scan lines TXL1 to TXLq of FIG. 1 are exemplarily shown.

Referring to FIGS. 1 and 2, the first to q-th scan lines TXL1 to TXLq may be divided into a plurality of scan line groups, and the scan signals applied to the first to q-th scan lines TXL1 to TXLq may also be divided into a plurality of scan signal groups. In each of group time periods included in one frame FR, scan signals of a corresponding scan signal group are applied to one scan line group. In FIG. 2, first and second scan signal groups TSG1 and TSG2 applied in first and second group time periods GT1 and GT2 are exemplarily shown. Scan line groups applied in other group time periods included in the frame FR may also be described similarly to that of FIG. 2.

The first to fourth scan signals TS1 to TS4 of the first scan signal group TSG1 are respectively applied to the first to fourth scan lines TXL1 to TXL4 in the first group time period GT1.

The first group time period GT1 may include first to fourth time periods T1 to T4 respectively corresponding to the first to fourth scan signals TS1 to TS4.

Each scan signal may include a negative pulse in a time period corresponding thereto and may include positive pulses in other time periods. In embodiments, as shown in FIG. 2, the first scan signal TS1 may include positive pulses in the first to third time periods T1 to T3 and may include the negative pulse in the fourth time period T4. The second scan signal TS2 may include the positive pulses in the first, second, and fourth time periods T1, T2, and T4, and may include the negative pulse in the third time period T3. The third scan signal TS3 may include the positive pulses in the first, third, and fourth time periods T1, T3, and T4, and may include the negative pulse in the second time period T2. The fourth scan signal TS4 may include the positive pulses in the second to fourth time periods T2 to T4, and may include the negative pulse in the first time period T1.

The second group time period GT2 may include fifth to eighth time periods T5 to T8 respectively corresponding to the fifth to eighth scan signals TS5 to TS8. At the fifth to eighth time periods T5 to T8, the fifth to eighth scan signals TS5 to TS8 may be substantially the same as the first to fourth scan signals TS1 to TS4 as shown in FIG. 2. As such, the four scan signals applied in each group time period may be substantially the same as the first to fourth scan signals TS1 to TS4.

Figure 3:
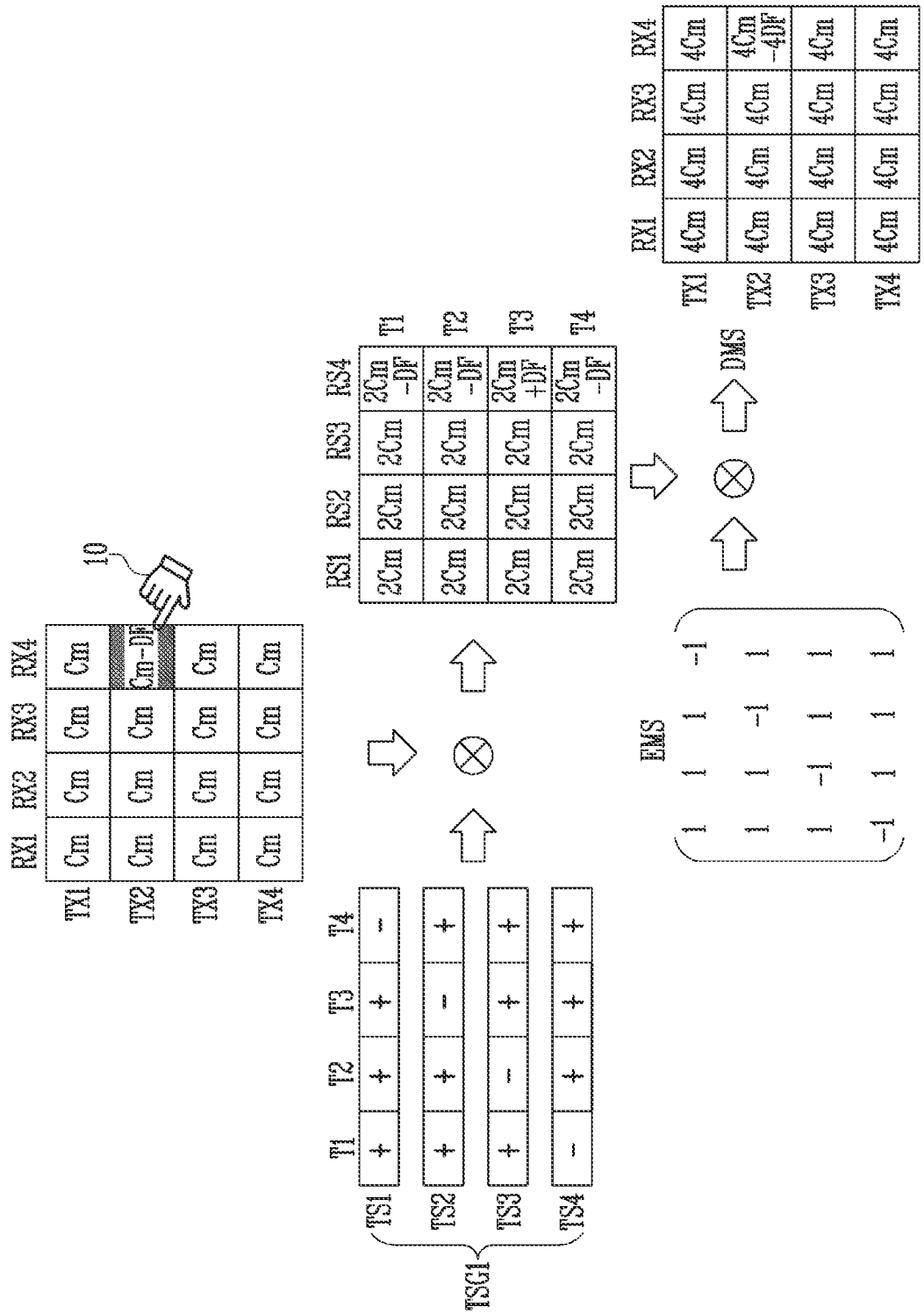
FIG. 3 is a diagram illustrating an embodiment of a method of sensing a touch provided to a touch panel when first to fourth scan signals of FIG. 2 are applied.

FIG. 3 is a diagram illustrating an embodiment of a method of sensing the touch provided to the touch panel when the first to fourth scan signals of FIG. 2 are applied.

Referring to FIGS. 1 and 3, the controller 120 may apply the first to fourth scan signals TS1 to TS4 of the first scan signal group TSG1 as described with reference to FIG. 2 to the first to fourth scan electrodes TX1 to TX4.

As described with reference to FIG. 1, the mutual capacitance Cm may exist at each of points (hereinafter, touch units) where the first to fourth scan electrodes TX1 to TX4 and first to fourth sensing electrodes RX1 to RX4 cross. In FIG. 3, the mutual capacitance Cm of each of the touch units between the first to fourth scan electrodes TX1 to TX4 and remaining sensing electrodes RX5 to RXp is omitted for clarity and a concise description. When a user 10 touches the touch unit of the second scan electrode TX2 and the fourth sensing electrode RX4, the touch unit of the second scan electrode TX2 and the fourth sensing electrode RX4 may have a changed mutual capacitance Cm-DF. For example, the mutual capacitance of the touch unit of the second scan electrode TX2 and the fourth sensing electrode RX4 may decrease by a change value DF according to a touch of the user 10.

The controller 120 may receive first to fourth sensing signals RS1 to RS4 from the first to fourth sensing electrodes RX1 to RX4. In FIG. 3, for convenience of explanation, components of each of the first to fourth sensing signals RS1 to RS4 are expressed using the mutual capacitance Cm. First to fourth rows of each sensing signal may correspond to the first to fourth time periods T1 to T4, respectively.

The components of the first to fourth sensing signals RS1 to RS4 may be proportional to a multiplication of a matrix formed of components (pulses) of the first to fourth scan signals TS1 to TS4 in the first to fourth time periods T1 to T4 and a matrix formed of the mutual capacitances of the touch units of the first to fourth scan electrodes TX1 to TX4 and the first to fourth sensing electrodes RX1 to RX4. As shown in FIG. 3, the first sensing signal RS1 may have a component of 2Cm for each of the first to fourth time periods T1 to T4, the second sensing signal RS2 may have a component of 2Cm for each of the first to fourth time periods T1 to T4, the third sensing signal RS3 may have a component of 2Cm for each of the first to fourth time periods T1 to T4, and the fourth sensing signal RS4 may have components 2Cm-DF, 2Cm-DF, 2Cm+DF, and 2Cm-DF for the first to fourth time periods T1 to T4, respectively.

The first to fourth scan signals TS1 to TS4 may be encoded, and thus, an encoding matrix EMS may be provided. The negative pulses of the first to fourth scan signals TS1 to TS4 may be target pulses corresponding to a matrix value of −1 in the encoding matrix. Each of the positive pulses of the first to fourth scan signals TS1 to TS4 may be reflected to the encoding matrix EMS as a matrix value of 1, and each of the negative pulses of the first to fourth scan signals TS1 to TS4 may be reflected to the encoding matrix EMS as a matrix value of −1. The first to fourth rows of the encoding matrix EMS may correspond to the first to fourth scan signals TS1 to TS4, respectively. First to fourth columns of the encoding matrix EMS may correspond to the first to fourth time periods T1 to T4. In embodiments, the first to fourth scan signals TS1 to TS4 may be generated by modulating (for example, multiplying) an arbitrary reference pulse according to a matrix (for example, an inverse matrix) associated with the encoding matrix EMS. Components of the first to fourth sensing signals RS1 to RS4 may be understood to be proportional to a multiplication of the encoding matrix EMS and a matrix formed by mutual capacitances of corresponding touch units.

The controller 120 is configured to sense the touch by decoding the first to fourth sensing signals RS1 to RS4. The controller 120 may generate a decoding matrix DMS by multiplying the encoding matrix EMS and the matrix formed of the components of the first to fourth sensing signals RS1 to RS4, and sense the touch according to the decoding matrix DMS. By the matrix multiplication described above, the decoding matrix DMS may have components 4Cm, 4Cm, 4Cm, and 4Cm in first to fourth columns of the first row, respectively, may have components 4Cm, 4Cm, 4Cm, and 4Cm-4DF in first to fourth columns of the second row, respectively, may have components 4Cm, 4Cm, 4Cm, and 4Cm in first to fourth columns of the third row, respectively, and may have components 4Cm, 4Cm, 4Cm, and 4Cm in first to fourth columns of the fourth row, respectively. The first to fourth rows of the decoding matrix DMS may correspond to the first to fourth scan electrodes TX1 to TX4, and the first to fourth columns may correspond to the first to fourth sensing electrodes RX1 to RX4. The decoding matrix DMS has a component 4Cm-4DF, which is a value different from other components in the fourth column of the second row. Accordingly, the controller 120 may sense that a touch occurs in the touch unit of the second scan electrode TX2 and the fourth sensing electrode RX4. The controller 120 may output touch data indicating a position of a corresponding touch.

A touch provided to the touch panel when the fifth to eighth scan signals TS5 to TS8 of the second scan signal group TSG2 of FIG. 2 are applied may also be sensed as described with reference to FIG. 3.

As such, the controller 120 may sense the touch by simultaneously applying scan signals of a scan signal group to a plurality of scan lines and decoding corresponding sensing signals based on the encoding matrix EMS.

Figure 4:
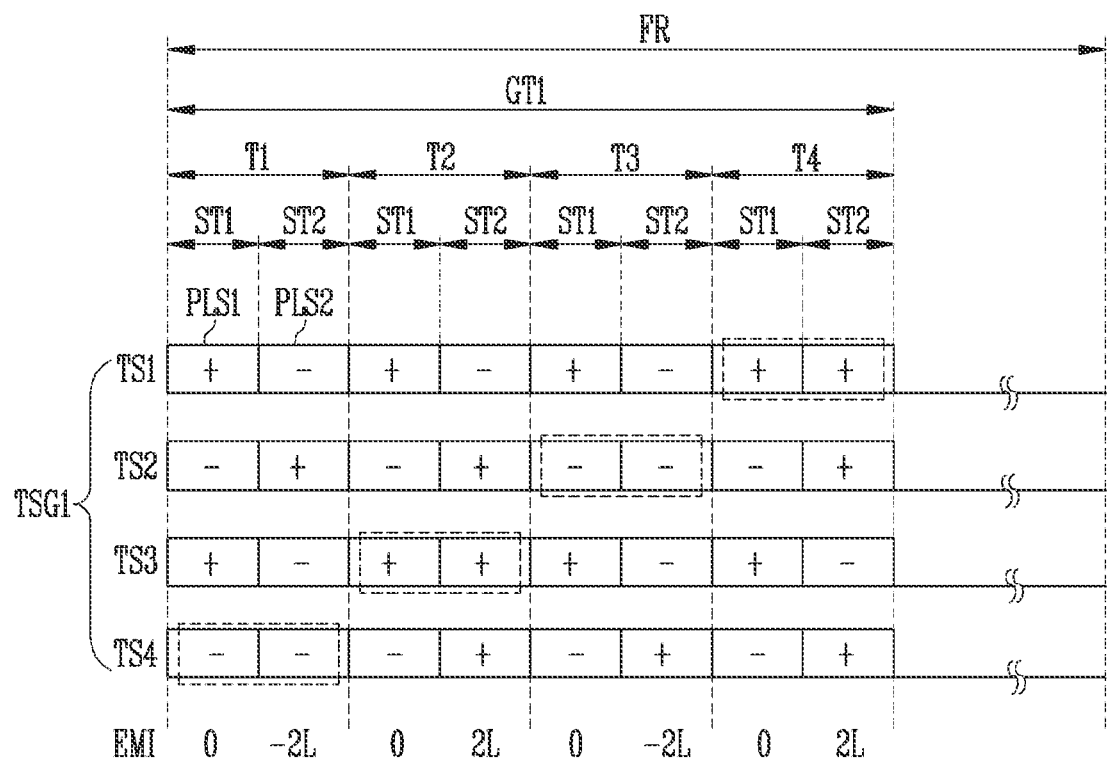
FIG. 4 is a timing diagram illustrating an embodiment of scan signals that may be applied in a group time period of a frame.
Figure 5A:
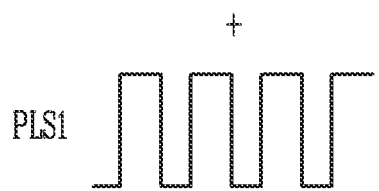
FIG. 5A is a timing diagram illustrating an embodiment of a first pulse of FIG. 4.
Figure 5B:
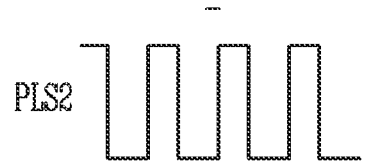
FIG. 5B is a timing diagram illustrating an embodiment of a second pulse of FIG. 4.

FIG. 4 is a timing diagram illustrating an embodiment of scan signals that may be applied in a group time period of a frame. FIG. 5A is a timing diagram illustrating an embodiment of the first pulse of FIG. 4. FIG. 5B is a timing diagram illustrating an embodiment of the second pulse of FIG. 4. FIGS. 6A to 6D are timing diagrams illustrating embodiments of the multiple pulses and the target pulses of FIG. 4.

In FIG. 4, for convenience of description, the first scan signal group TSG1 applied in the first group time period GT1 among the group time periods of the frame FR is exemplarily shown. Also in another group time period of the frame FR, scan signals similar to the scan signals TS1 to TS4 of the first scan signal group TSG1 may be applied to corresponding scan lines.

Referring to FIGS. 1 and 4, the first to fourth scan signals TS1 to TS4 of the first scan signal group TSG1 are applied to the first to fourth scan lines TXL1 to TXL4, respectively, in the first group time period GT1.

The first group time period GT1 may include the first to fourth time periods T1 to T4 corresponding to the first to fourth scan signals TS1 to TS4, respectively. Each of the first to fourth time periods T1 to T4 may include first and second sub-time periods ST1 and ST2.

Each scan signal may include the multiple pulses or the target pulse in each of the first to fourth time periods T1 to T4. Each scan signal may include the target pulse in a corresponding time period and may include the multiple pulses in remaining time periods.

Each of the multiple pulses and the target pulse may include a plurality of unit pulses, for example, two unit pulses, and the two unit pulses may be applied in the first and second sub-time periods ST1 and ST2 of the time period, respectively.

The multiple pulses may include a first pulse PLS1 and a second pulse PLS2 having phases opposite to each other as unit pulses. The first pulse PLS1 may be a positive pulse, and the second pulse PLS2 may be a negative pulse having a phase opposite to that of the positive pulse. In FIG. 4, the first pulse PLS1 is indicated by "+" and the second pulse PLS2 is indicated by "−". For example, the first pulse PLS1 may have a pulse shape as shown in FIG. 5A, and the second pulse PLS2 may have a pulse shape as shown in FIG. 5B. However, embodiments are not limited thereto. The first pulse PLS1 and the second pulse PLS2 may be modified in various characteristics such as, for example, a pulse width, a pulse amplitude, and the like while having opposite phases (or polarities).

Figure 6A:
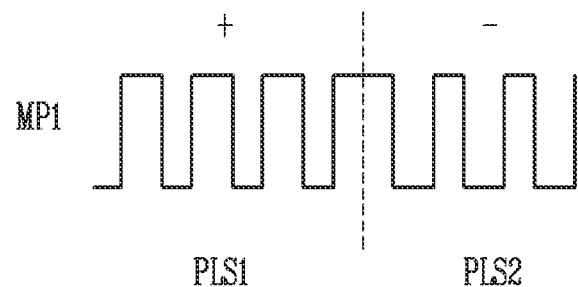
FIGS. 6A to 6D are timing diagrams illustrating embodiments of multiple pulses and target pulses of FIG. 4.
Figure 6B:
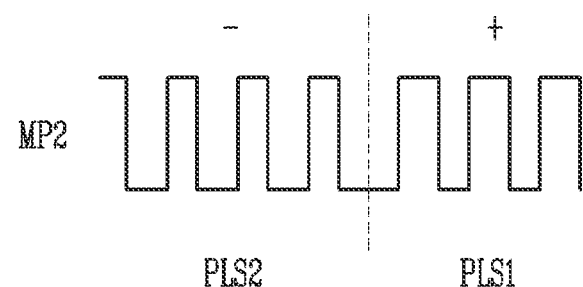

The multiple pulses may be a first type of multiple pulses MP1 (hereinafter first multiple pulses) having the first pulse PLS1 and the second pulse PLS2 sequentially generated, or a second type of multiple pulses MP2 (hereinafter second multiple pulses) having the second pulse PLS2 and the first pulse PLS1 sequentially generated. For example, the first multiple pulses MP1 may include a stream of the first pulse PLS1 and the second pulse PLS2 as shown in FIG. 6A. For example, the second multiple pulses MP2 may include a stream of the second pulse PLS2 and the first pulse PLS1 as shown in FIG. 6B. As such, the first multiple pulses MP1 and the second multiple pulses MP2 may have phases (or polarities) opposite to each other.

The target pulse may include a regular pulse having a constant phase. In embodiments, the target pulse may include the repeated first pulse PLS1 as unit pulses or may include the repeated second pulse PLS2 as unit pulses. In other words, the target pulse may be a first type of target pulse TP1 (hereinafter a first target pulse) including only the first pulse PLS1 or a second type of target pulse TP2

Figure 6C:
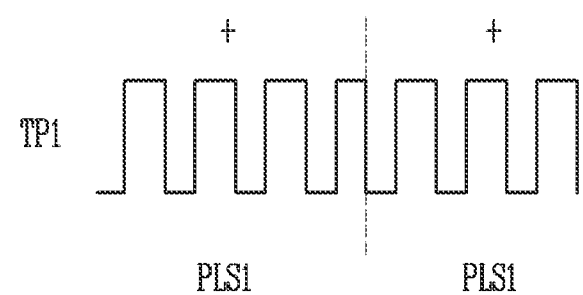
Figure 6D:
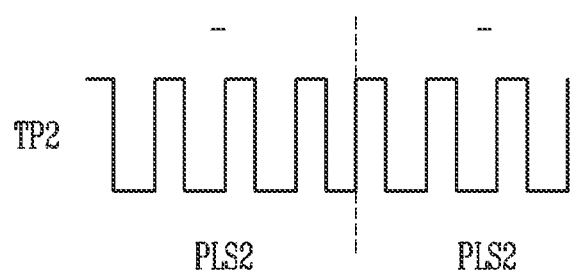

(hereinafter a second target pulse) including only the second pulse PLS2. For example, the first target pulse TP1 may include a stream of two successive first pulses PLS1 as shown in FIG. 6C, and the second target pulse TP2 may include a stream of two successive second pulses PLS2 as shown in FIG. 6D. As such, the first target pulse TP1 and the second target pulse TP2 may have phases (or polarities) opposite to each other.

Each of the first to fourth scan signals TS1 to TS4 may include target pulses in different time periods. As described above, the first group time period GT1 may include the first to fourth time periods T1 to T4 respectively corresponding to the first to fourth scan signals TS1 to TS4, and each of the first to fourth scan signals TS1 to TS4 may have the target pulse in a time period corresponding thereto. In FIG. 4, as indicated by dotted line boxes, the first to fourth scan signals TS1 to TS4 may have the target pulses in the fourth, third, second, and first time periods T4, T3, T2, and T1, respectively.

According to an embodiment of the disclosure, in each of the first to fourth time periods T1 to T4, multiple pulses applied to adjacent scan lines (e.g., directly adjacent scan lines) may have phases opposite to each other. In embodiments, any one of the first to fourth scan signals TS1 to TS4 may include the first multiple pulses MP1. A scan signal adjacent thereto (e.g., directly adjacent thereto) may include the second multiple pulses MP2. The first multiple pulses MP1 and the second multiple pulses MP2 have phases opposite to each other at an arbitrary time point.

In embodiments, the first scan signal TS1 may have the first multiple pulses MP1 in each of the first to third time periods T1 to T3, and the second scan signal TS2 may have the second multiple pulses MP2 in each of the first, second, and fourth time periods T1, T2, and T4. The third scan signal TS3 may have the first multiple pulses MP1 in each of the first, third, and fourth time periods T1, T3, and T4. The fourth scan signal TS4 may have the second multiple pulses MP2 in each of the second to fourth time periods T2 to T4.

As such, odd-numbered scan signals TS1 and TS3 may include the first multiple pulses MP1, and even-numbered scan signals TS2 and TS4 may include the second multiple pulses MP2. Accordingly, EMI caused by the first to fourth scan signals TS1 to TS4 may offset other.

For example, when the first pulse PLS1 has a signal level L, the second pulse PLS2 has an opposite phase, and thus, the second pulse PLS2 may have a signal level −L at the same time point. In the first sub-time period ST1 of the first time period T1, the first to fourth scan signals TS1 to TS4 may include the first pulse PLS1, the second pulse PLS2, the first pulse PLS1, and the second pulse PLS2, respectively, and thus, a sum of signal levels thereof is 0. EMI caused by the first to fourth scan signals TS1 to TS4 in the first sub-time period ST1 of the first time period T1 may substantially correspond to 0. In the second sub-time period ST2 of the first time period T1, the first to fourth scan signals TS1 to TS4 may include the second pulse PLS2, the first pulse PLS1, the second pulse PLS2, and the second pulse PLS2, respectively, and thus, the sum of the signal levels thereof is −2 L. EMI caused by the first to fourth scan signals TS1 to TS4 in the second sub-time period ST2 of the first time period T1 may correspond to −2 L. When calculating in a similar method, EMI corresponding to 0 and 2 L may occur in the first and second sub-time periods ST1 and ST2 of the second time period T2, respectively, EMI corresponding to 0 and −2 L may occur in the first and second sub-time periods ST1 and ST2 of the third time period T3, respectively, and EMI corresponding to 0 and 2 L may occur in the first and second sub-time periods ST1 and ST2 of the fourth time period T4, respectively.

When the first to fourth scan signals TS1 to TS4 include multiple pulses of the same phase, in at least a portion of the sub-time periods ST1 and ST2 of the first to fourth time periods T1 to T4, the sum of the signal levels may increase. For example, when all of the first to fourth scan signals TS1 to TS4 include the first multiple pulses MP1, the sum of the signal levels in the first sub-time period ST1 of the first time period T1 may be 2 L, and the sum of the signal levels in the second sub-time period ST2 of the first time period T1 may be −4 L. As such, when the first to fourth scan signals TS1 to TS4 include the multiple pulses of the same phase, EMI may relatively increase.

According to an embodiment of the disclosure, multiple pulses of phases opposite to each other are applied to scan lines adjacent (e.g., directly adjacent) to each other. Accordingly, EMI caused by the scan signals TS1 to TS4 may be reduced.

In addition, target pulses applied to scan lines adjacent (e.g., directly adjacent) to each other may have phases opposite to each other. In FIG. 4, the first scan signal TS1 has the first target pulse TP1 in the fourth time period T4, the second scan signal TS2 has the second target pulse TP2 in the third time period T3, the third scan signal TS3 has the first target pulse TP1 in the second time period T2, and the fourth scan signal TS4 has the second target pulse TP2 in the first time period T1. Accordingly, the sum of the signal levels in the entire first to fourth time periods T1 to T4 may decrease, and EMI may be further reduced.

When all of the target pulses of the first to fourth scan signals TS1 to TS4 of FIG. 4 are the second target pulse TP2, the sum of the signal levels of the entire first to fourth time periods T1 to T4 may be −8 L. On the other hand, as shown in FIG. 4, target pulses adjacent (e.g., directly adjacent) to each other of the first to fourth scan signals TS1 to TS4 may have phases opposite to each other. Accordingly, the sums of the signal levels in the sub-time periods ST1 and ST2 of the first to fourth time periods T1 to T4 are 0, −2 L, 0, 2 L, 0, −2 L, 0, and 2 L, respectively, and a sum thereof is 0. As such, as the target pulses applied to the scan lines adjacent (e.g., directly adjacent) to each other have the phases opposite to each other, EMI may be further reduced.

Figure 7:
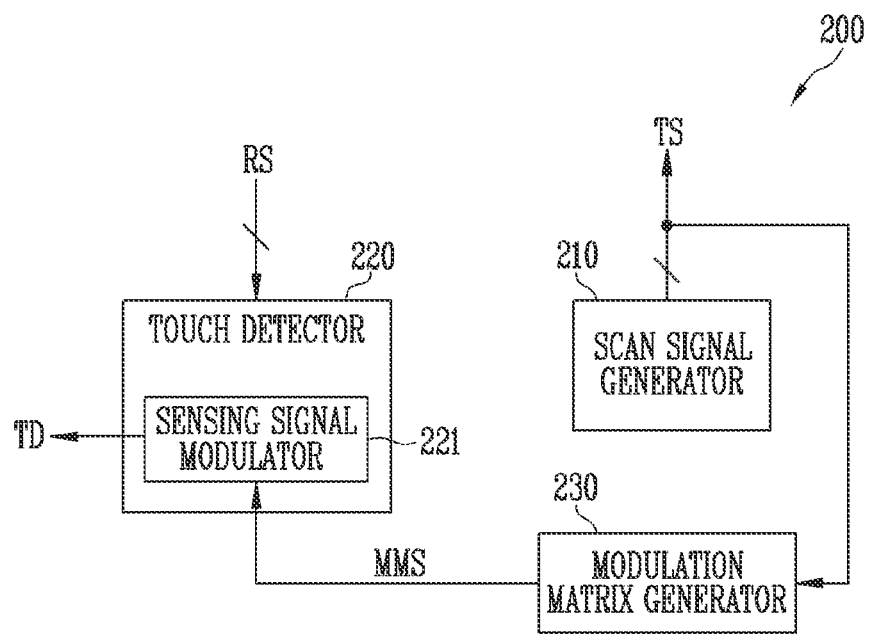
FIG. 7 is a block diagram illustrating an embodiment of a controller of FIG. 1.

FIG. 7 is a block diagram illustrating an embodiment of the controller of FIG. 1.

Referring to FIG. 7, the controller 200 may include a scan signal generator 210, a touch detector 220, and a modulation matrix generator 230.

The scan signal generator 210 is connected to the first to q-th scan lines TXL1 to TXLq of FIG. 1, and is configured to apply scan signals TS to the first to q-th scan electrodes TX1 to TXq of FIG. 1 through the first to q-th scan lines TXL1 to TXLq. The first to q-th scan lines TXL1 to TXLq may be grouped into a plurality of scan line groups, and scan lines of each scan line group may be driven substantially simultaneously. Scan signals applied to each scan line group are provided similarly to the first to fourth scan signals TS1 to TS4 of FIG. 4. Hereinafter, for convenience of explanation, a further description of components and technical aspects previously described will be omitted.

The touch detector 220 is connected to the first to p-th sensing lines RXL1 to RXLp of FIG. 1, and is configured to receive sensing signals RS from the first to p-th sensing electrodes RX1 to RXp of FIG. 1 through the first to p-th sensing lines RXL1 to RXLp. The touch detector 220 may further include a sensing signal modulator 221 configured to generate touch data TD according to the sensing signals RS. The sensing signal modulator 221 may detect the position of the touch by decoding the sensing signals RS based on a modulation matrix MMS.

The modulation matrix generator 230 is configured to generate the modulation matrix MMS by encoding the scan signals applied in each group time period among the scan signals TS.

The modulation matrix MMS may be used to decode the sensing signals RS received in each group time period. The modulation matrix MMS may be provided as the encoding matrix EMS of FIG. 3. As described with reference to FIG. 3, the sensing signal modulator 221 may generate the decoding matrix DMS by multiplying the modulation matrix MMS and the matrix of the components of the sensing signals RS of the corresponding group time period. The sensing signal modulator 221 may generate the touch data TD by detecting the position of the touch according to the decoding matrix DMS.

Figure 8:
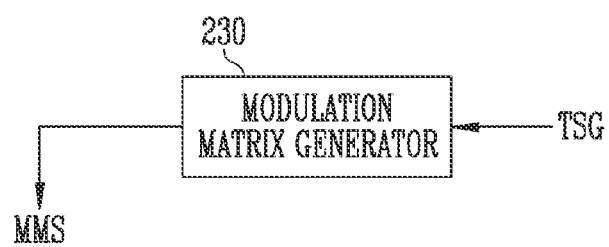
FIG. 8 is a block diagram illustrating an example of output data of a modulation matrix generator for a scan signal group applied in one group time period.

FIG. 8 is a block diagram illustrating an example of output data of the modulation matrix generator for a scan signal group applied in one group time period.

Referring to FIG. 8, the modulation matrix generator 230 may generate the modulation matrix MMS by encoding the scan signals of each scan signal group TSG among the scan signals TS.

For example, in the first group time period GT1 of FIG. 4, the scan signal group TSG of FIG. 8 may be the first scan signal group TSG1 of FIG. 4. The modulation matrix generator 230 may generate the modulation matrix MMS based on the first to fourth scan signals TS1 to TS4. The modulation matrix MMS may include matrix values defined by four rows and four columns. The four rows of the modulation matrix MMS may correspond to the first to fourth scan signals TS1 to TS4, and the four columns of the modulation matrix MMS may correspond to the first to fourth time periods T1 to T4. In each of the first to fourth time periods T1 to T4, the modulation matrix generator 230 may determine a corresponding matrix value as 1 in response to each of the multiple pulses of the scan signals TS1 to TS4, and determine a corresponding matrix value as −1 in response to each of the target pulses of the scan signals TS1 to TS4. For example, the modulation matrix generator 230 may be configured to determine a corresponding matrix value as 1 in response to each of the first multiple pulses MP1 of FIG. 4, determine a corresponding matrix value as 1 in response to each of the second multiple pulses MP2 of FIG. 4, determine a corresponding matrix value as −1 in response to each of the first multiple pulses MP1 of FIG. 4, and determine a corresponding matrix value as −1 in response to each of the second multiple pulses MP2 of FIG. 4. As such, the modulation matrix generator 230 may generate the modulation matrix MMS including the matrix values shown in FIG. 8 by encoding the first to fourth scan signals TS1 to TS4.

As such, the modulation matrix MMS associated with the scan signals of the scan signal group TSG may be generated. As described with reference to FIG. 8, the sensing signals RS of a corresponding group time period may be decoded based on the modulation matrix MMS.

Figure 9:
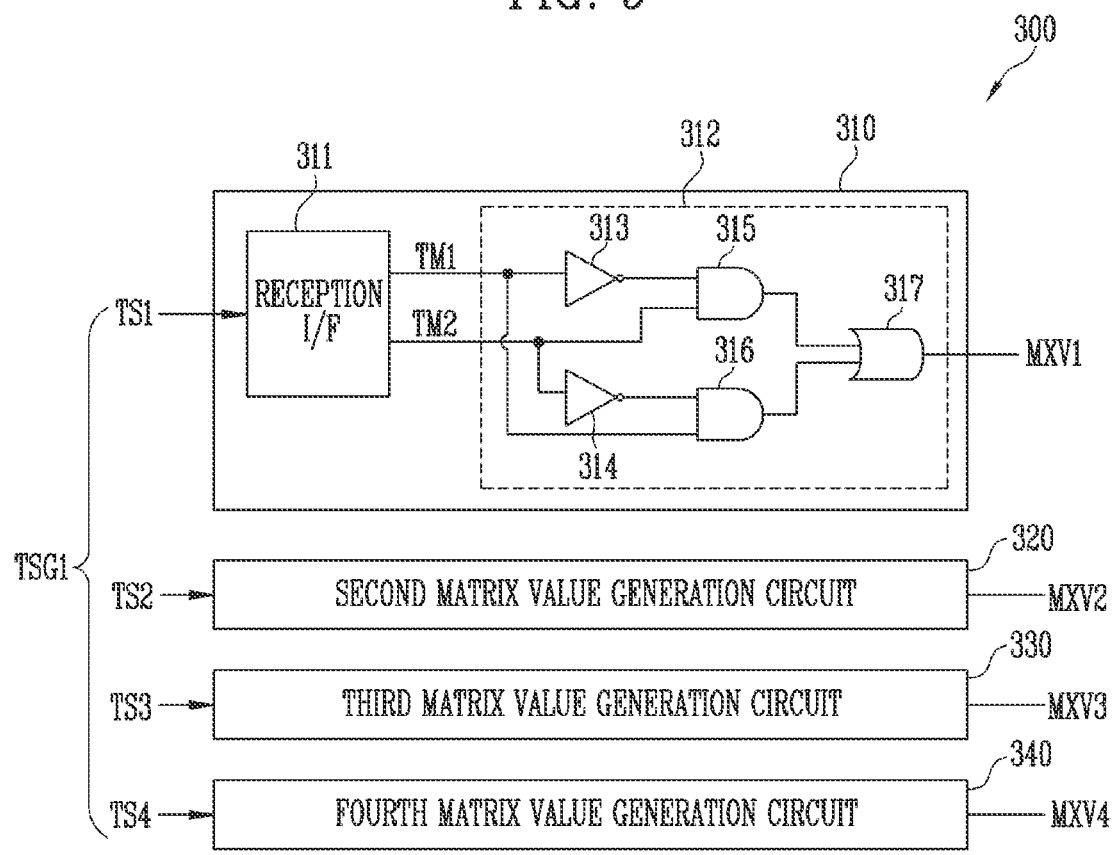
FIG. 9 is a block diagram illustrating an embodiment of the modulation matrix generator of FIG. 8.

FIG. 9 is a block diagram illustrating an embodiment of the modulation matrix generator of FIG. 8.

Referring to FIG. 9, the modulation matrix generator 300 may include first to fourth matrix value generation circuits 310, 320, 330 and 340. The first to fourth matrix value generation circuits 310 to 340 may receive the scan signals applied in each group time period. In FIG. 9, for convenience of description, a case where the first to fourth matrix value generation circuits 310 to 340 receive the first to fourth scan signals TS1 to TS4 of the first group time period GT1 of FIG. 4 is shown.

The first matrix value generation circuit 310 may include a reception interface (I/F) 311 and an exclusive OR (XOR) operator 312. The XOR operator 312 may also be referred to as an XOR circuit.

The reception interface 311 is configured to receive the first scan signal TS1. The reception interface 311 is configured to substantially simultaneously transmit unit pulses included in the first scan signal TS1 to a first terminal TM1 and a second terminal TM2, respectively, in each of the first to fourth time periods T1 to T4. In embodiments, the reception interface 331 may include a delay buffer configured to delay the unit pulse of the first sub-time period ST1 to output the unit pulse of the first sub-time period ST1 substantially simultaneously with the unit pulse of the second sub-time period ST2.

The XOR operator 312 is connected to the reception interface 311 through the first terminal TM1 and the second terminal TM2. The XOR operator 312 is configured to perform an XOR operation on the unit pulse received through the first terminal TM1 and the unit pulse received through the second terminal TM2. For example, when the first scan signal TS1 has the first multiple pulses MP1 as in the first time period T1, the XOR operator 312 may output a logic level high as a first matrix value MXV1. For example, when the first scan signal TS1 has the first target pulse TP1 as in the fourth time period T4, the XOR operator 312 may output a logic level low as the first matrix value MXV1.

In embodiments, the XOR operator 312 may include first and second inversion logic gates 313 and 314, first and second AND gates 315 and 316, and an OR gate 317. The first inversion logic gate 313 may have an input terminal connected to the first terminal TM1, and the second inversion logic gate 314 may have an input terminal connected to the second terminal TM2. The first AND gate 315 may have a first input terminal connected to an output terminal of the first inversion logic gate 313, and a second input terminal connected to the second terminal TM2. The second AND gate 316 may have a first input terminal connected to an output terminal of the second inversion logic gate 314, and a second input terminal connected to the first terminal TM1. The OR gate 317 may have a first input terminal connected to an output terminal of the first AND gate 315, and a second input terminal connected to an output terminal of the second AND gate 316. An output of the OR gate 317 may be provided as the first matrix value MXV1. When the output of the OR gate 317 is a signal of a logic level high, the first matrix value MXV1 may correspond to 1. When the output of the OR gate 317 is a signal of a logic level low, the first matrix value MXV1 may correspond to −1. In addition, configurations of the XOR operator 312 may be variously changed to perform the exclusive OR operation on the unit pulses of the first and second terminals TM1 and TM2.

The second to fourth matrix value generation circuits 320 to 340 may be configured similarly to the first matrix value generation circuit 310 except that the second to fourth matrix value generation circuits 320 to 340 receive the second to fourth scan signals TS2 to TS4, respectively. Accordingly, the second to fourth matrix value generation circuits 320 to 340 may output second to fourth matrix values MXV2, MXV3 and MXV4.

As such, the first to fourth matrix value generation circuits 310 to 340 may generate the modulation matrix MMS of FIG. 8 by generating the first to fourth matrix values MXV1 to MXV4 corresponding to the first to fourth scan signals TS1 to TS4 of the first to fourth time periods T1 to T4.

Figure 10:
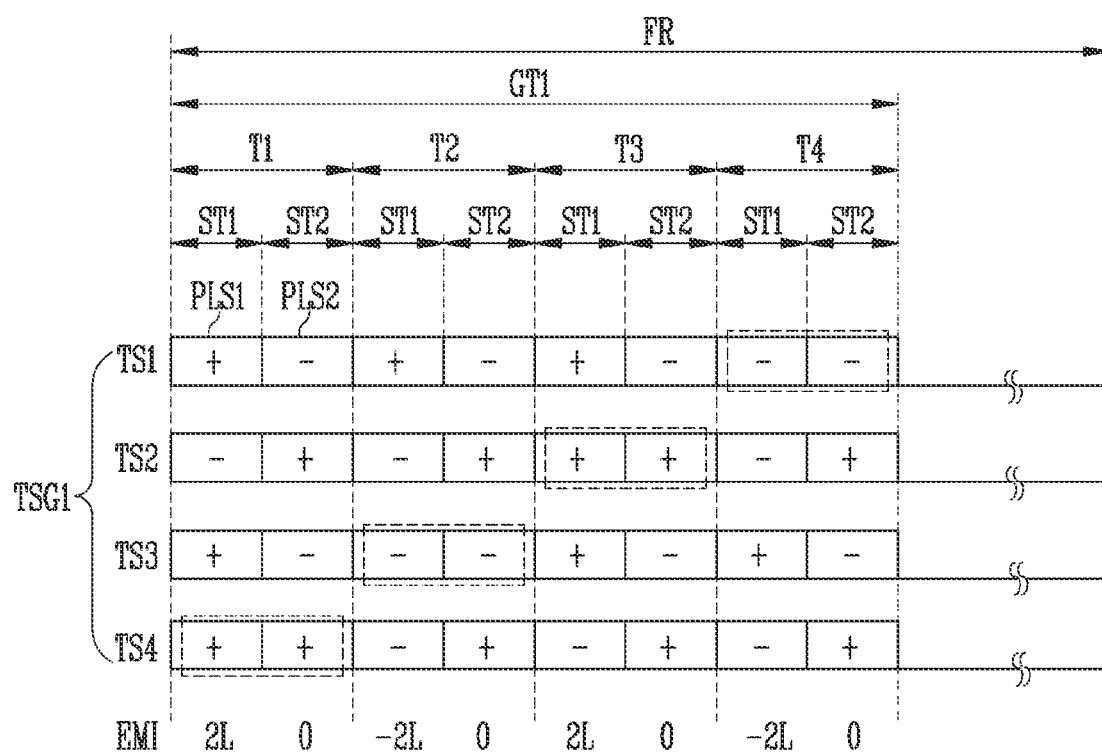
FIG. 10 is a timing diagram illustrating an embodiment of the scan signals that may be applied in the group time period of the frame.

FIG. 10 is a timing diagram illustrating an embodiment of the scan signals that may be applied in the group time period of the frame.

The target pulses applied to the scan lines adjacent (e.g., directly adjacent) to each other may have phases opposite to each other, and under such a condition, the target pulse applied to each scan line may be variously modified. Referring to FIG. 10, when compared with the first to fourth scan signals TS1 to TS4 of FIG. 4, the first and third scan signals TS1 and TS3 include the second target pulse TP2, and the second and fourth scan signals TS2 and TS4 include the first target pulse TP1. The first scan signal TS1 may include the second target pulse TP2 in the fourth time period T4, the second scan signal TS2 may include the first target pulse TP1 in the third time period T3, the third scan signal TS3 may include the second target pulse TP2 in the second time period T2, and the fourth scan signal TS4 may include the first target pulse TP1 in the first time period T1. Also in this case, similar to an embodiment according to FIG. 4, a total sum of the signal levels in the entire first to fourth time periods T1 to T4 may be 0. For example, as shown in FIG. 10, sums of the signal levels in the sub-time periods ST1 and ST2 of the first to fourth time periods T1 to T4 are 2 L, 0, −2 L, 0, 2 L, 0, −2 L, and 0, respectively, and a total sum thereof is 0. As such, according to an embodiment of FIG. 10, EMI may be minimized or reduced.

Figure 11:
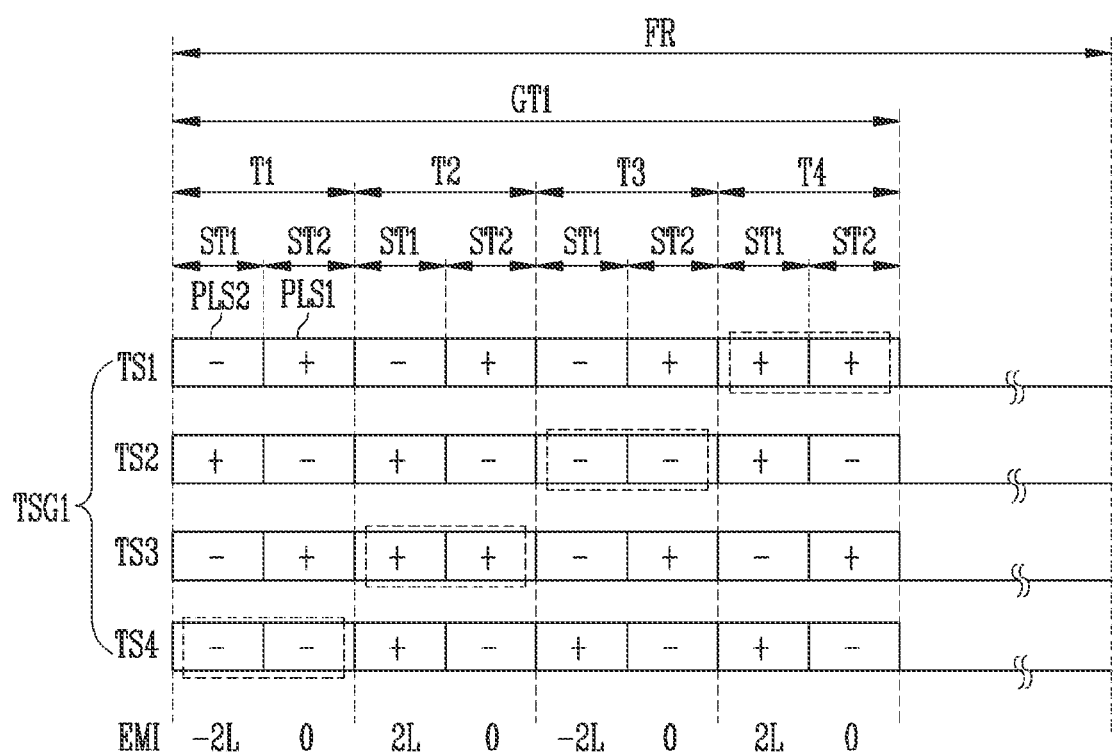
FIG. 11 is a timing diagram illustrating an embodiment of the scan signals that may be applied in the group time period of the frame.

FIG. 11 is a timing diagram illustrating an embodiment of the scan signals that may be applied in the group time period of the frame.

The target pulses applied to the scan lines adjacent (e.g., directly adjacent) to each other may have phases opposite to each other, and under such a condition, the target pulse applied to each scan line may be variously modified. Referring to FIG. 11, when compared with the first to fourth scan signals TS1 to TS4 of FIG. 4, each of the first and third scan signals TS1 and TS3 may include the second multiple pulses MP2, and each of the second and fourth scan signals TS2 and TS4 may include the first target pulses MP1. Also in this case, similar to an embodiment according to FIG. 4, the total sum of the signal levels in the entire first to fourth time periods T1 to T4 may be 0. For example, as shown in FIG. 11, the sums of the signal levels in the sub-time periods ST1 and ST2 of the first to fourth time periods T1 to T4 are −2L, 0, 2L, 0, −2L, 0, 2L, and 0, respectively, and a total sum thereof is 0. As such, according to an embodiment of FIG. 11, EMI may be minimized or reduced.

Figure 12:
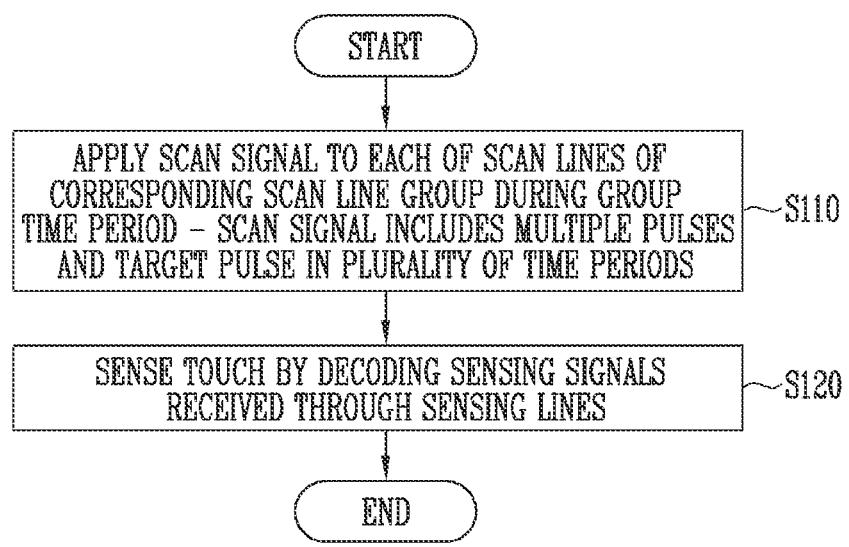
FIG. 12 is a flowchart illustrating a method of sensing a touch according to an embodiment of the disclosure.

FIG. 12 is a flowchart illustrating a method of sensing a touch according to an embodiment of the disclosure.

Hereinafter, in the description with reference to FIG. 12, for clarity and conciseness, a method in which the scan signals are applied to one scan line group to sense the touch is described. Similarly, the scan signals may be applied to each of the other scan line groups to sense the touch.

Referring to FIGS. 1 and 12, in operation S1101, the scan signals are applied to scan lines of a corresponding scan line group among the first to q-th scan lines TXL1 to TXLq during the group time period. The scan signals may be configured similarly to the first to fourth scan signals TS1 to TS4 of FIG. 4. Each scan signal may include the plurality of multiple pulses and the target pulse in a plurality of time periods of the group time period.

In operation S1201, the sensing signals received through the first to p-th sensing lines RXL1 to RXLp are decoded to sense the touch.

In embodiments, operations S110 and S120 may be performed by the controller 120 of FIG. 1.

Figure 13:
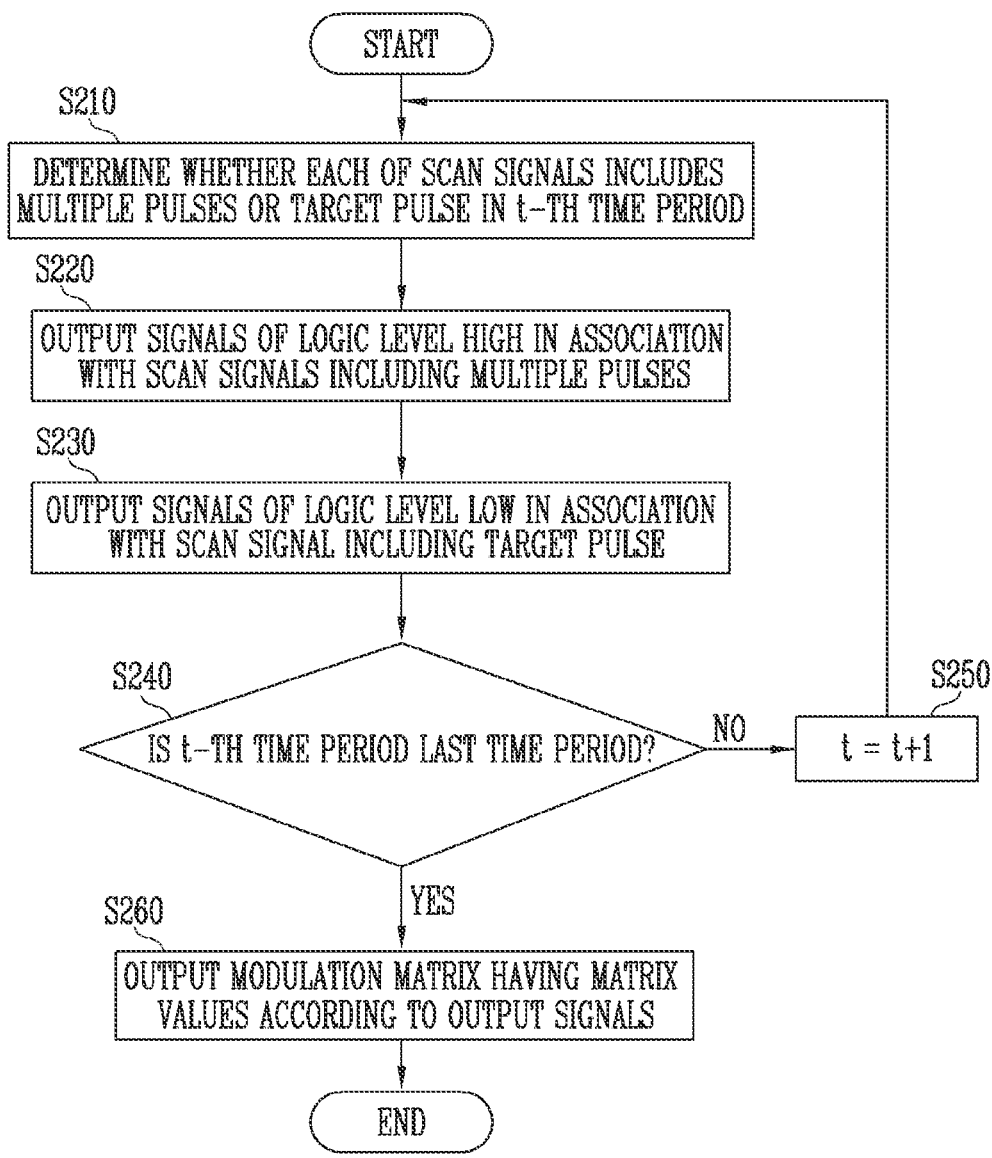
FIG. 13 is a flowchart illustrating a method of generating a modulation matrix for decoding of operation S120 of FIG. 12 according to an embodiment of the disclosure.

FIG. 13 is a flowchart illustrating a method of generating the modulation matrix for decoding of operation S120 of FIG. 12.

Referring to FIG. 13, in operation S210, it is determined whether each of the scan signals includes the multiple pulses or the target pulse in a t-th time period of the group time period. For example, the t-th time period may be the first time period T1 of FIG. 4.

In operation S220, signals of a logic level high are output in association with the scan signals including the multiple pulses. In operation S230, signals of a logic level low are output in association with the scan signals including the target pulse.

For example, in the first time period T1 of FIG. 4, the first scan signal TS1 includes the first multiple pulses MP1, the second scan signal TS2 includes the second multiple pulses MP2, the third scan signal TS3 includes the first multiple pulses MP1, and the fourth scan signal TS4 includes the second target pulse TP2. Accordingly, in the first time period T1, a signal of a logic level high, a signal of a logic level high, a signal of a logic level high, and a signal of a logic level low may be output in association with the first to fourth scan signals TS1 to TS4.

In operation S240, it is determined whether the t-th time period is a last time period of the group time period. When the t-th time period is not the last time period of the group time period, operation S250 is performed. When the t-th time period is the last time period of the group time period, operation S260 is performed.

In operation S250, a next time period of the t-th time period is determined as the t-th time period, and subsequently, operations S210 to S240 are performed again. For example, operations S210 to S240 are performed again for the second time period T2 of FIG. 4. As such, operations S210 to S240 may be repeatedly performed in each of the time periods of the group time period.

In operation S260, a modulation matrix having matrix values corresponding to the output signals is output. Columns of the modulation matrix may correspond to time periods, respectively, and rows of the modulation matrix may correspond to the scan signals. For example, the modulation matrix MMS of FIG. 8 may be generated based on the first to fourth scan signals TS1 to TS4 of FIG. 4. Decoding of operation S120 of FIG. 12 may be performed based on the generated modulation matrix.

Figure 14:
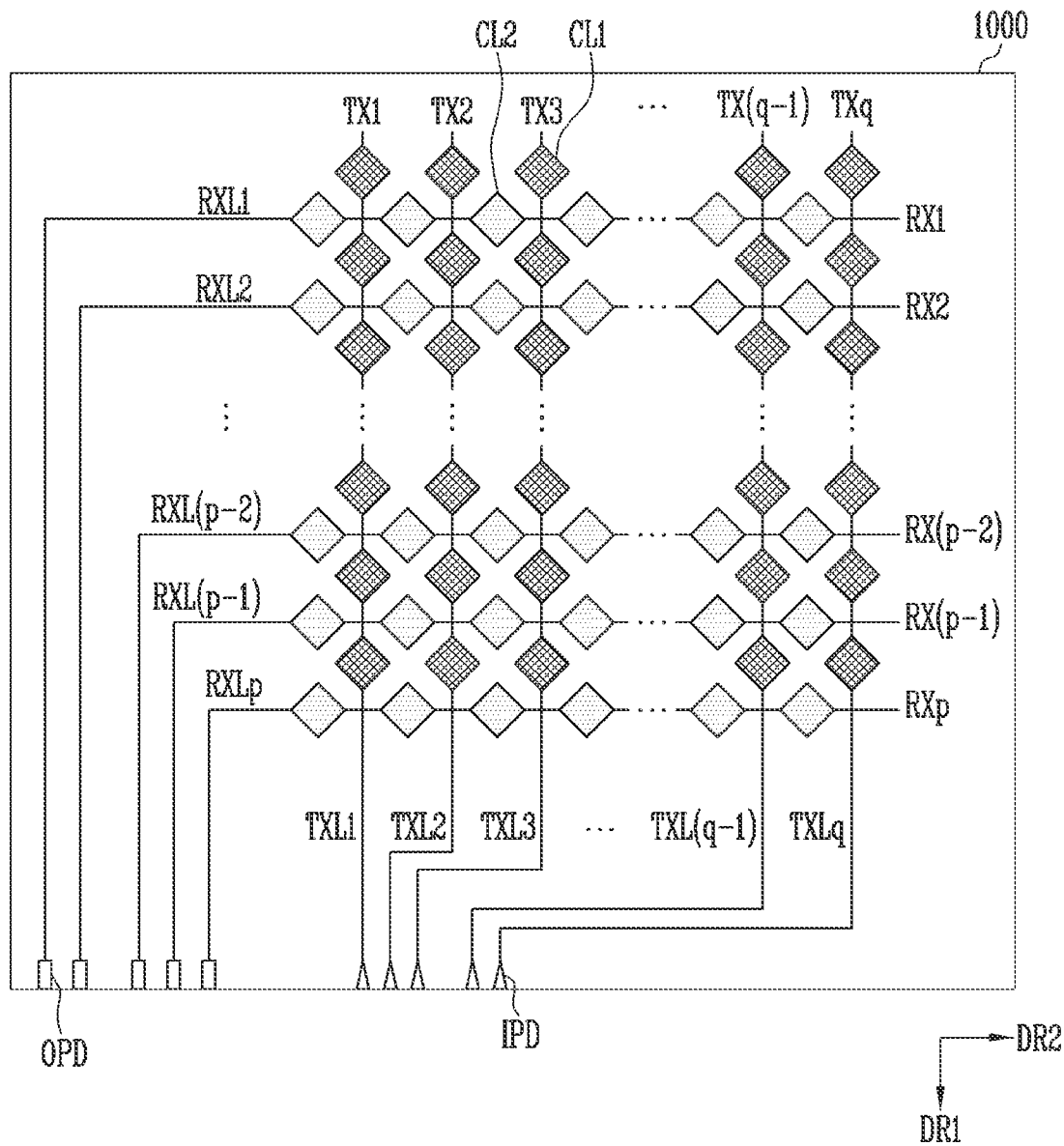
FIG. 14 is a block diagram illustrating an embodiment of a touch panel of FIG. 1.

FIG. 14 is a block diagram illustrating an embodiment of the touch panel of FIG. 1.

Referring to FIG. 14, the touch panel 1000 may include the first to q-th scan electrodes TX1 to TXq and the first to p-th sensing electrodes RX1 to RXp. The first to q-th scan electrodes TX1 to TXq may be connected to the first to q-th scan lines TXL1 to TXLq, respectively. The first to p-th sensing electrodes RX1 to RXp may be connected to the first to p-th sensing lines RXL1 to RXLp, respectively.

Each of the first to q-th scan electrodes TX1 to TXq may include first cells CL1 arranged in the first direction DR1 and electrically connected to each other, and each of the first to p-th sensing electrodes RX1 to RXp may include second cells CL2 arranged in the second direction and electrically connected to each other. In FIG. 14, each of the first cells CL1 and the second cells CL2 is shown as having a diamond shape. However, embodiments are not limited thereto. For example, each of the first cells CL1 and the second cells CL2 may have at least one of various shapes such as a circular shape, a quadrangular shape, a triangle shape, and a mesh shape. In addition, the first cells CL1 and the second cells CL2 may be formed as a single layer or multiple layers. As such, shapes and arrangements of the first to q-th scan electrodes TX1 to TXq and the first to p-th sensing electrodes RX1 to RXp may be variously modified.

In embodiments, the first cells CL1 and the second cells CL2 may have conductivity by including at least one of various conductive materials such as a metal material or a transparent conductive material. For example, the first cells CL1 and the second cells CL2 may include at least one of various metal materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof.

The touch panel 1000 may be provided as the touch panel 110 of FIG. 1.

The touch panel 1000 may further include input pads IPD connected to the first to q-th scan lines TXL1 to TXLq. The controller 120 of FIG. 1 may be connected to the first to q-th scan lines TXL1 to TXLq through the input pads IPD.

The touch panel 1000 may further include output pads OPD connected to the first to p-th sensing lines RXL1 to RXLp. The controller 120 may be connected to the first to p-th sensing lines RXL1 to RXLp through the output pads OPD.

Figure 15:
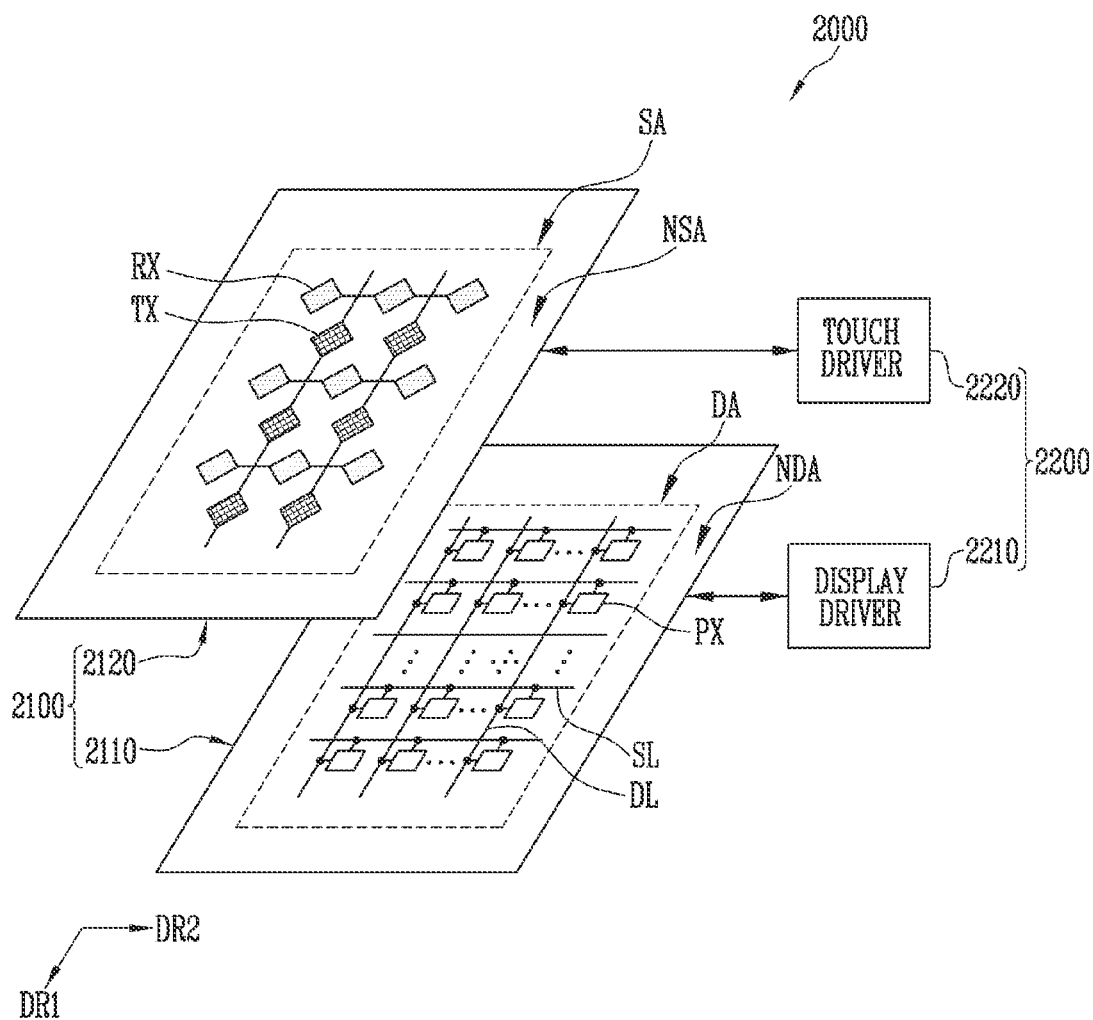
FIG. 15 is a block diagram illustrating an embodiment of a display device including the touch sensor.

FIG. 15 is a block diagram illustrating an embodiment of the display device including the touch sensor.

Referring to FIG. 15, the display device 2000 may include a panel 2100 and a panel driver 2200 that drives the panel 2100.

The panel 2100 may include a display panel 2110 and a touch panel 2120 overlapping the display panel 2110.

In embodiments, the display panel 2110 and the touch panel 2120 may be separately manufactured and then coupled to overlap each other at least partially. In embodiments, the display panel 2110 and the touch panel 2120 may be integrally manufactured. In this case, the touch panel 2120 may be directly formed on at least one layer configuring the display panel 2110, for example, an upper substrate, a thin film encapsulation layer, or an insulating layer of the display panel 2110.

In FIG. 15, the touch panel 2120 is disposed on the display panel 2110, but the touch panel 2120 is not limited thereto. For example, the touch panel 2120 may be disposed below the display panel 2110 according to embodiments.

The display panel 2110 may include a display area DA in which an image is displayed and a non-display area NDA in which an image is not displayed around the display area DA. The non-display area NDA may at least partially surround the display area DA. The display panel 2110 may include pixels PX formed on a substrate. The pixels PX may be disposed in the display area DA, and not in the non-display area NDA. In embodiments, the substrate may be a rigid substrate including a material such as, for example, glass or tempered glass. In embodiments, the substrate may be a flexible substrate including a material such as, for example, plastic or metal.

The pixels PX are connected to driving lines SL and data lines DL. The pixels PX are selected by a driving signal of a turn-on level supplied through the driving lines SL and receive data signals through the data lines DL. Accordingly, the pixels PX emit light of luminance corresponding to the data signals, and an image is displayed in the display area DA.

Lines and/or an embedded circuits connected to the pixels PX may be disposed in the non-display area NDA. For example, a scan driver may be disposed in the non-display area NDA.

In embodiments, the display panel 2110 may include, for example, organic light emitting elements (organic light emitting diodes), inorganic light emitting elements (inorganic light emitting diodes), quantum dot/well light emitting elements (quantum dot/well light emitting diodes), and the like as the pixels PX. In embodiments, the display panel 2110 may be implemented as a liquid crystal display panel. In this case, the display device 2000 may additionally include a light source such as a back-light unit.

The touch panel 2120 may include an active area SA capable of sensing the touch and a non-active area NSA around the active area SA. The active area SA may at least partially overlap the display area DA.

The touch panel 2120 may include a substrate, and scan electrodes TX and sensing electrodes RX formed on the substrate. The scan electrodes TX and the sensing electrodes RX may be disposed in the active area SA on the substrate. In embodiments, the substrate may be a rigid substrate including a material such as, for example, glass or tempered glass. In embodiments, the substrate may be a flexible substrate including a material such as, for example, plastic or metal. In embodiments, at least one layer configuring the display panel 2110 may be used as the substrate of the touch panel 2120.

The touch panel 2120 may be implemented as the touch panel 1000 of FIG. 14.

The panel driver 2200 may include a display driver 2210 that drives the display panel 2110 and a touch driver 2220 that drives the touch panel 2120. In embodiments, the display driver 2210 and the touch driver 2220 may be configured as separate integrated chips (ICs). In embodiments, the display driver 2210 and the touch driver 2220 may be mounted in one IC.

The display driver 2210 is electrically connected to the display panel 2110 and drives the pixels PX. For example, the display driver 2210 may include a data driver connected to the data lines DL, a scan driver connected to drive lines SL, and a timing controller controlling the data driver and the scan driver. As another example, the display driver 2210 may include the data driver and the timing controller, and the scan driver may be disposed in the non-display area NDA of the display panel 2110.

The touch driver 2220 is connected to the touch panel 2120 and drives the touch panel 2120. The controller 120 of FIG. 1 may be provided as the touch driver 2220.

The display driver 2210 may display an image on the display panel 2110 in units of a display frame. The touch driver 2220 may sense the touch in units of a sensing frame (for example, FR of FIG. 4). A sensing frame period and a display frame period may be synchronized or asynchronous with each other.

Referring to a comparative example, scan signals supplied to electrodes of the touch sensor may act as electromagnetic interference (EMI) (or noise) for components inside the touch sensor, and other components of the display device and/or the electronic device, and the EMI (or noise) may cause reduction of reliability of operations of the touch sensor, the display device, and/or the electronic device. Embodiments of the disclosure may minimize or reduce such EMI, as described above.

While the disclosure has been particularly shown and described with reference to embodiments thereof, it will be understood by those of ordinary skill in the art that various changes in form and detail may be made therein without departing from the spirit and scope of the disclosure as defined by the following claims.

What is claimed is:

1. A touch sensor, comprising:
a plurality of first touch electrodes;
a plurality of second touch electrodes that form mutual capacitances with the first touch electrodes; and
a controller that generates touch data by applying a scan signal to each of scan lines connected to the first touch electrodes during substantially a same time, and that receives sensing signals from the second touch electrodes through sensing lines,
wherein the controller applies a plurality of multiple pulses and a plurality of target pulses as the scan signal to the scan lines in a plurality of time periods,
each of the plurality of multiple pulses includes a first pulse and a second pulse of phases opposite to each other,
multiple pulses among the plurality of multiple pulses applied to scan lines adjacent to each other among the scan lines have phases opposite to each other, and
target pulses among the plurality of target pulses respectively applied to the scan lines adjacent to each other have phases opposite to each other.

2. The touch sensor according to claim 1, wherein the plurality of multiple pulses includes first multiple pulses sequentially including the first pulse and the second pulse, and second multiple pulses sequentially including the second pulse and the first pulse.

3. The touch sensor according to claim 2, wherein the controller applies the first multiple pulses and the second multiple pulses to the scan lines adjacent to each other among the scan lines, respectively.

4. The touch sensor according to claim 1, wherein one of the plurality of target pulses includes a regular pulse having a constant phase.

5. The touch sensor according to claim 4, wherein the one of the plurality of target pulses includes the first pulse or the second pulse.

6. The touch sensor according to claim 1, wherein each of the scan lines receives the one of the plurality of target pulses in different time periods among the plurality of time periods.

7. The touch sensor according to claim 1, wherein the target pulses include a first target pulse including the first pulse and a second target pulse including the second pulse, and
the controller applies the first target pulse and the second target pulse to the scan lines adjacent to each other among the scan lines, respectively.

8. The touch sensor according to claim 1, wherein the controller includes a touch detector that generates the touch data by sensing the sensing signals through the sensing lines and decoding the sensing signals based on a matrix.

9. The touch sensor according to claim 8, wherein the controller includes a matrix generator that generates the matrix according to the scan signal applied to each of the scan lines,
the matrix generator outputs first signals corresponding to a logic level high in response to the plurality of multiple pulses of the scan signal, and outputs a second signal corresponding to a logic level low in response to the target pulse of the scan signal, and
the matrix includes matrix values corresponding to the first signals and the second signal.

10. The touch sensor according to claim 8, wherein the controller includes a matrix generator that generates the matrix according to the scan signal applied to each of the scan lines, and
the matrix generator generates the matrix by performing an exclusive OR operation between pulses included in the scan signal in each of the plurality of time periods.

11. A touch sensor, comprising:
a plurality of first touch electrodes extending in a first direction and connected to scan line groups;
a plurality of second touch electrodes extending in a second direction crossing the first direction and forming mutual capacitances with the first touch electrodes; and
a controller that drives each of the scan line groups and generates touch data by receiving sensing signals from the second touch electrodes,
wherein the controller applies a plurality of multiple pulses and a plurality of target pulses to scan lines of a first scan line group among the scan line groups over first time periods,
each of the plurality of multiple pulses includes a first pulse and a second pulse of phases opposite to each other,
in at least one of the first time periods, multiple pulses among the plurality of multiple pulses applied to scan lines adjacent to each other among the scan lines have phases opposite to each other, and
target pulses among the plurality of target pulses respectively applied to the scan lines adjacent to each other have phases opposite to each other.

12. The touch sensor according to claim 11, wherein the controller applies the plurality of multiple pulses and the plurality of target pulses to scan lines of a second scan line group among the scan line groups over second time periods, and
in at least one of the second time periods, multiple pulses among the plurality of multiple pulses respectively applied to scan lines adjacent to each other among the scan lines of the second scan line group have phases opposite to each other.

13. The touch sensor according to claim 11, wherein one of the plurality of target pulses includes a regular pulse having a constant phase.

14. The touch sensor according to claim 11, wherein each of the scan lines receives the one of the plurality of target pulses in different time periods among the first time periods.

15. A method of sensing a touch using first touch electrodes and second touch electrodes that form mutual capacitances with the first touch electrodes, the method comprising:
applying a scan signal to each of scan lines connected to the first touch electrodes during substantially a same time period, the scan signal including a plurality of multiple pulses and a target pulse in a plurality of time periods;
sensing the touch by receiving sensing signals from the second touch electrodes through sensing lines,
wherein each of the plurality of multiple pulses includes a first pulse and a second pulse of phases opposite to each other, and
multiple pulses among the plurality of multiple pulses respectively applied to scan lines adjacent to each other among the scan lines have phases opposite to each other;

outputting first signals corresponding to a logic level high in response to the plurality of multiple pulses of the scan signal; and outputting a second signal corresponding to a logic level low in response to the target pulse of the scan signal.

16. The method according to claim 15, wherein sensing the touch comprises sensing the touch by decoding the sensing signals based on a matrix including matrix values corresponding to the first signals and the second signal.

17. The method according to claim 15, wherein applying the scan signal comprises applying the target pulse to each of the scan lines in different time periods among the plurality of time periods.

* * * * *